United States Patent
Nishikawa

(10) Patent No.: US 9,888,004 B2
(45) Date of Patent: Feb. 6, 2018

(54) PROCESSING APPARATUS, AUTHORITY SETTING METHOD, AND STORAGE MEDIUM STORING PROGRAM

(71) Applicant: BROTHER KOGYO KABUSHIKI KAISHA, Nagoya-shi, Aichi-ken (JP)

(72) Inventor: Naoki Nishikawa, Toyoake (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 80 days.

(21) Appl. No.: 14/868,492

(22) Filed: Sep. 29, 2015

(65) Prior Publication Data

US 2016/0099932 A1    Apr. 7, 2016

(30) Foreign Application Priority Data

Oct. 1, 2014    (JP) .................................. 2014-203382

(51) Int. Cl.
  *H04L 29/06*    (2006.01)

(52) U.S. Cl.
  CPC ............ *H04L 63/10* (2013.01); *H04L 63/083* (2013.01); *H04L 63/102* (2013.01); *H04L 63/0853* (2013.01); *H04N 2201/0094* (2013.01)

(58) Field of Classification Search
  CPC . H04L 63/0583; H04L 63/08; H04L 63/0815; H04L 63/083; H04L 63/10; H04L 63/102; H04N 2201/0094
  See application file for complete search history.

(56) References Cited

U.S. PATENT DOCUMENTS

| | | | |
|---|---|---|---|
| 2005/0172151 A1* | 8/2005 | Kodimer | G06F 21/31 726/5 |
| 2005/0273620 A1* | 12/2005 | Kawabata | G06F 21/608 713/182 |
| 2008/0016582 A1* | 1/2008 | Morimoto | H04N 1/00347 726/28 |

(Continued)

FOREIGN PATENT DOCUMENTS

| | | |
|---|---|---|
| JP | 2005-313413 A | 11/2005 |
| JP | 2006-86642 A | 3/2006 |

(Continued)

*Primary Examiner* — Hadi Armouche
*Assistant Examiner* — Sher A Khan
(74) *Attorney, Agent, or Firm* — Scully, Scott, Murphy & Presser, P.C.

(57) ABSTRACT

A processing apparatus performs: in response to reception of first information by one of the network interface and the user interface, identifying, as a first function, a function corresponding to the first information out of a plurality of functions relating to image data; setting a first authority corresponding to the first information, the first authority being authority to use the first function; after setting the first authority, when one of the network interface and the user interface receives second information different from the first information and when functions identified by the second information out of the plurality of functions include at least part of the first function and a function other than the first function, identifying the function other than the first function as a second function; and setting a second authority corresponding to the second information, the second authority being authority to use the second function.

10 Claims, 9 Drawing Sheets

(56) References Cited

U.S. PATENT DOCUMENTS

| | | | |
|---|---|---|---|
| 2008/0028449 A1* | 1/2008 | Shigeeda | G06F 21/608 726/6 |
| 2008/0130026 A1* | 6/2008 | Mizuno | G06F 21/608 358/1.9 |
| 2008/0288879 A1 | 11/2008 | Tomita et al. | |
| 2009/0024531 A1* | 1/2009 | Yamahata | G06F 21/31 705/55 |
| 2009/0147306 A1* | 6/2009 | Sugiyama | G06F 3/1222 358/1.15 |
| 2010/0235888 A1* | 9/2010 | Miyamoto | G06F 21/608 726/4 |
| 2011/0258697 A1* | 10/2011 | Ikeda | G06F 21/31 726/16 |
| 2012/0243010 A1* | 9/2012 | Aihara | H04N 1/00411 358/1.9 |
| 2013/0100479 A1* | 4/2013 | Kamishiro | G06F 3/1238 358/1.14 |

FOREIGN PATENT DOCUMENTS

| | | |
|---|---|---|
| JP | 2008-266978 A | 11/2009 |
| JP | 2010-68542 A | 3/2010 |
| JP | 2013-257818 A | 12/2013 |

\* cited by examiner

FIG. 5

| USER ID | PASSWORD | FUNCTION |
|---------|----------|----------|
| 1234 | XXXX | A, B, C |
| 5678 | YYYY | C, D |
| 3456 | ZZZZ | A |
| ⋮ | ⋮ | ⋮ |

| LOGIN METHOD | FUNCTION |
|---|---|
| LOCAL LOGIN | A, B |
| REMOTE LOGIN | C, D |

| LOGIN METHOD | FUNCTION |
|---|---|
| LOCAL LOGIN | A, B, C, D |
| REMOTE LOGIN | A |

PROCESSING APPARATUS, AUTHORITY SETTING METHOD, AND STORAGE MEDIUM STORING PROGRAM

CROSS REFERENCE TO RELATED APPLICATIONS

This application claims priority from Japanese Patent Application No. 2014-203382 filed Oct. 1, 2014. The entire content of the priority application is incorporated herein by reference.

TECHNICAL FIELD

This disclosure relates to a processing apparatus having a plurality of functions using image data, a processing system including a processing apparatus and one or plurality of connected apparatuses connected to the processing apparatus so as to perform communication with the processing apparatus, an authority setting method executable on a processing apparatus, and a storage medium storing a program installed on a computer of a processing apparatus.

BACKGROUND

For example, an MFP (Multi-Function Peripheral) has a plurality of functions. The functions include a printer function, a scanner function, and a facsimile function. The printer function is a function of forming an image of image data on paper and so on. The scanner function is a function of reading an image on an original document. The facsimile function is a function of transmitting and receiving image data through public telephone network.

An MFP connected to a LAN (Local Area Network) can be operated from an operation panel (local operation) as well as from an external terminal such as a PC (Personal Computer) through LAN (remote operation). When the local operation and the remote operation are possible, it becomes an issue what process is to be performed when these operations are performed at overlapping time.

For example, it can be conceived that, in order to avoid overlapping of local operation and remote operation, access from an external terminal to an MFP is prohibited during local operation, and local operation is prohibited during remote operation. In that case, however, a function that is not used by preceding local operation or remote operation is also prohibited from use by following remote operation or local operation, which is not reasonable.

Thus, it is proposed that, regarding the same function as a function used by the preceding local operation or remote operation, use by the following remote operation or local operation is prohibited. In this case, regarding a function other than the function used by the preceding local operation or remote operation, the use by the following remote operation or local operation can be permitted.

SUMMARY

However, when a user who previously performed local operation or remote operation attempts to use a function other than the function the user is currently using, and the function is used by following remote operation or local operation, the user who previously performed local operation or remote operation cannot use that function.

According to one aspect, this specification discloses a processing apparatus. The processing apparatus includes: a network interface configured to be connected to one or plurality of connected apparatuses through a network and configured to receive information transmitted from the one or plurality of connected apparatuses; a user interface configured to receive input of information; a processor; and a memory storing instructions, the instructions, when executed by the processor, causing the processor to perform: a first function identifying process of, in response to reception of first information by one of the network interface and the user interface, identifying, as a first function, a function corresponding to the first information out of a plurality of functions relating to image data; a first authority setting process of setting a first authority corresponding to the first information, the first authority being authority to use the first function identified by the first function identifying process; a second function identifying process of, after the first authority setting process, when one of the network interface and the user interface receives second information different from the first information and when functions identified by the second information out of the plurality of functions include at least part of the first function and a function other than the first function, identifying the function other than the first function as a second function; and a second authority setting process of setting a second authority corresponding to the second information, the second authority being authority to use the second function identified by the second function identifying process.

According to another aspect, this specification also discloses another processing apparatus. The processing apparatus includes: a network interface configured to be connected to one or plurality of connected apparatuses through a network and configured to receive information transmitted from the one or plurality of connected apparatuses; a user interface configured to receive input of information; a processor; and a memory storing instructions, the instructions, when executed by the processor, causing the processor to perform: a first function identifying process of, in response to reception of first information by a first interface that is one of the network interface and the user interface, identifying, as a first function, a function corresponding to the first interface out of a plurality of functions relating to image data; a first authority setting process of setting a first authority corresponding to the first interface, the first authority being authority to use the first function identified by the first function identifying process; a second function identifying process of, after the first authority setting process, when second information is received by a second interface that is another one of the network interface and the user interface and when functions corresponding to the second interface out of the plurality of functions include at least part of the first function and a function other than the first function, identifying the function other than the first function as a second function; and a second authority setting process of setting a second authority corresponding to the second interface, the second authority being authority to use the second function identified by the second function identifying process.

According to still another aspect, this specification also discloses an authority setting method executable by a processing apparatus. The processing apparatus has a network interface configured to be connected to one or plurality of connected apparatuses through a network and configured to receive information transmitted from the one or plurality of connected apparatuses, and a user interface configured to receive input of information. The method includes: identifying, in response to reception of first information by one of the network interface and the user interface, a function corresponding to the first information out of a plurality of functions relating to image data as a first function; setting a first authority corresponding to the first information, the first authority being authority to use the first function; after setting the first authority, when one of the network interface and the user interface receives second information different from the first information and when functions identified by the second information out of the plurality of functions include at least part of the first function and a function other than the first function, identifying the function other than the first function as a second function; and setting a second authority corresponding to the second information, the second authority being authority to use the second function.

According to still another aspect, this specification also discloses a non-transitory computer-readable storage medium storing a program executable on a processing apparatus. The processing apparatus has a network interface configured to be connected to one or plurality of connected apparatuses through a network and configured to receive information transmitted from the one or plurality of connected apparatuses, and a user interface configured to receive input of information. The program includes: a first function identifying instruction of, in response to reception of first information by one of the network interface and the user interface, identifying, as a first function, a function corresponding to the first information out of a plurality of functions relating to image data; a first authority setting instruction of setting a first authority corresponding to the first information, the first authority being authority to use the first function identified by the first function identifying instruction; a second function identifying instruction of, after the first authority setting instruction, when one of the network interface and the user interface receives second information different from the first information and when functions identified by the second information out of the plurality of functions include at least part of the first function and a function other than the first function, identifying the function other than the first function as a second function; and a second authority setting instruction of setting a second authority corresponding to the second information, the second authority being authority to use the second function identified by the second function identifying instruction.

BRIEF DESCRIPTION OF THE DRAWINGS

Embodiments in accordance with this disclosure will be described in detail with reference to the following figures wherein:

FIG. 5 shows an example of a user management table;

DETAILED DESCRIPTION

Hereinafter, some aspects of this disclosure will be described while referring to the accompanying drawings.

<System Configuration>

Figure 1:
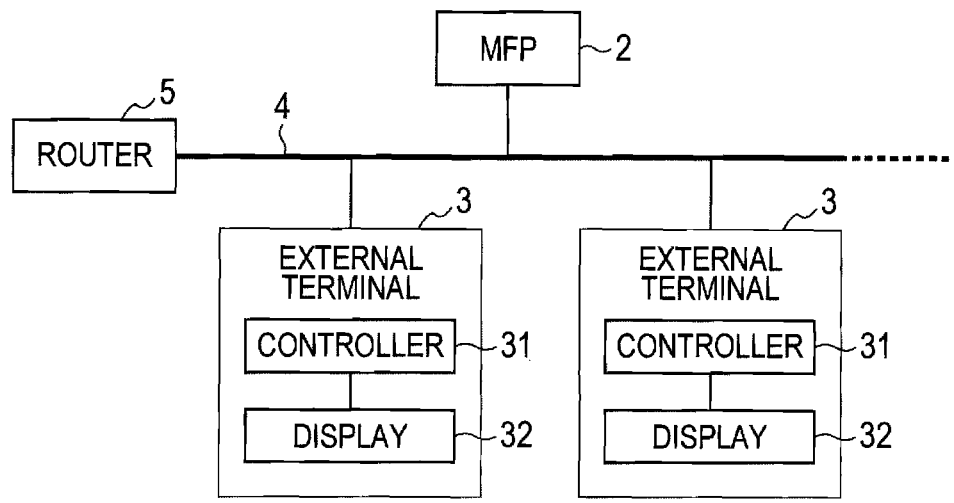
FIG. 1 is a schematic diagram showing the configuration of an image forming system according to an embodiment.

As shown in FIG. 1, a processing system 1 includes an MFP (Multi-Function Peripheral) 2 and a plurality of external terminals 3. The MFP 2 as an example of a processing apparatus is a multifunction peripheral having a printer function, a scanner function, and a facsimile function. Each external terminal 3 as an example of a connected apparatus includes a controller 31 having a CPU and a memory and a display 32 as an example of a second display.

The MFP 2 and the plurality of external terminals 3 is connected to a LAN (Local Area Network) 4. The MFP 2 and the external terminals 3 are configured to perform communication through the LAN 4 by functions of a router 5. The LAN 4 may be wired LAN or wireless LAN. Or, the LAN 4 may include both wired LAN and wireless LAN.

<Electrical Configuration of MFP>

Figure 2:
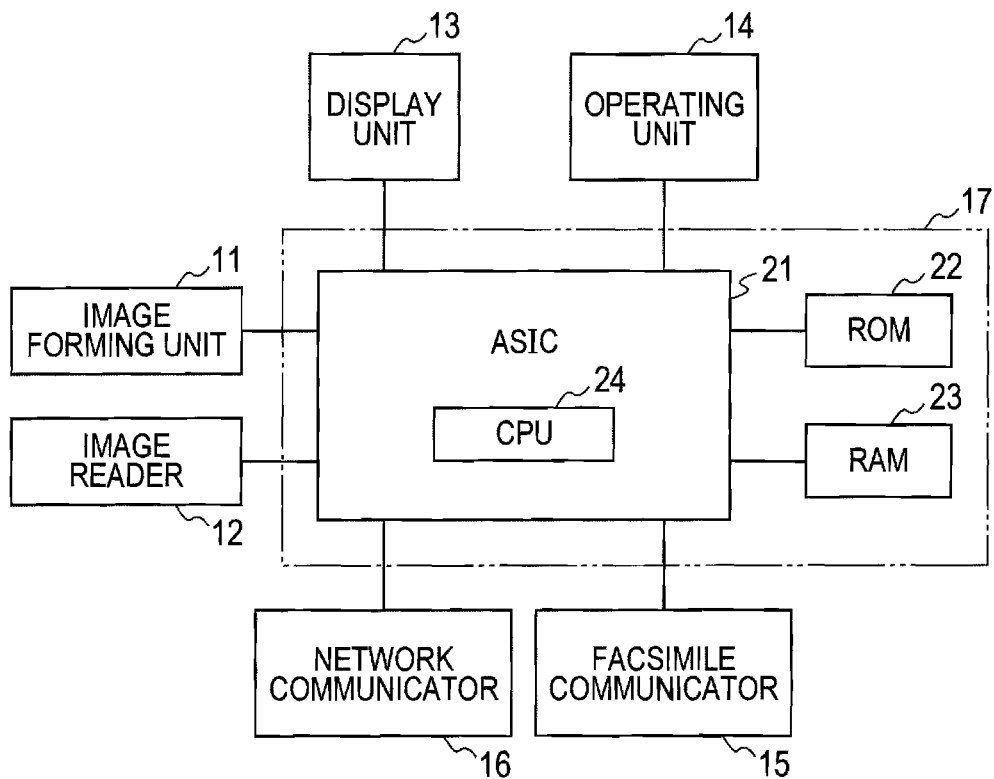
FIG. 2 is a block diagram showing the relevant parts of the electrical configuration of an MFP.

As shown in FIG. 2, the MFP 2 includes an image forming unit 11, an image reader 12, a display unit 13, an operating unit 14, a facsimile communicator 15, a network communicator 16, and a controller 17.

The image forming unit 11 performs printing based on image data (color printing or monochromatic printing) and forms an image on a sheet. The method of image formation may be an electrophotographic method or may be an inkjet method.

The image reader 12 includes an image sensor, an AFE (Analog Front End), and so on. In the image reader 12, an image sensor reads an image of an original document and outputs an analog image signal, and the AFE converts the analog image signal into a digital image data.

The display unit 13 serving as an example of a first display is a liquid crystal display unit, for example.

The operating unit 14 serving as an example of a user interface includes operating buttons operated for inputting various instructions (for example, a start key, ten keys, and a cursor key) and so on.

The facsimile communicator 15 includes a modem having an NCU (Network Control Unit) therein and so on, for facsimile communication through a telephone network.

The network communicator 16 serving as an example of a receiver or a network interface includes a circuit for network communication through the LAN 4 (see FIG. 1), and so on.

The controller 17 includes an ASIC (Application Specific Integrated Circuit) 21, a ROM 22, a RAM 23, and so on.

The ASIC 21 includes a CPU 24 serving as an example of a processor. Image data acquired by the image reader 12, operation signals indicative of operations of the operating unit 14, and so on are inputted to the ASIC 21. The CPU 24 controls the image forming unit 11, the image reader 12, and the display unit 13 by executing programs stored in the ROM 22 based on signals inputted to the ASIC 21 and so on, and controls the facsimile communicator 15 and the network communicator 16 for communication. When the CPU 24 executes control (program), the RAM 23 is used as a work area. Further, the RAM 23 serving as an example of a memory includes a nonvolatile memory such as an NVRAM (Non Volatile RAM).

<Overview of Authority Setting>

The functions of the MFP 2 are classified roughly into a printer function, a scanner function, and a facsimile function. More specifically, the functions of the MFP 2 includes a normal print function of printing image data included in a file (print job) transmitted from a PC (Personal Computer) which is the external terminal 3, a secure print function that requires input of a password for secure print for performing printing, a direct print function of acquiring a file stored in a removable media such as a USB memory and printing image data included in the file, a normal scan function of instructing starting scan by operation of the operating unit 14, a PC scan function of instructing starting scan from a PC, a normal FAX function of instructing starting FAX communication (facsimile communication) by operation of the operating unit 14, a PC FAX function of instructing starting FAX communication from a PC, and so on. Further, in a case where the MFP 2 is configured to perform near field wireless communication by NFC (Near Field Communication), the functions of the MFP 2 include, for example, an NFC print function of acquiring a file from a mobile terminal such as a smartphone and a mobile phone by near field wireless communication and printing image data included in the file, and so on.

Use of various functions of the MFP 2 requires login by a user. In the MFP 2, when user authentication succeeds after login by a user, a login state of the user is kept until the user logs off. The MFP 2 stores users who are allowed to use the MFP 2, and stores functions that are usable by users in association with the users. In the MFP 2, when the login state of a plurality of users is kept, authority to use various functions of the MFP 2 is set for each user based on functions that are usable by each user and on a login sequence of the users.

Hereinafter, in order to differentiate each user, a user who logs in the Nth (N is a natural number) from a state where no user has logged in the MFP 2 is referred to as "Nth user".

Figure 3:
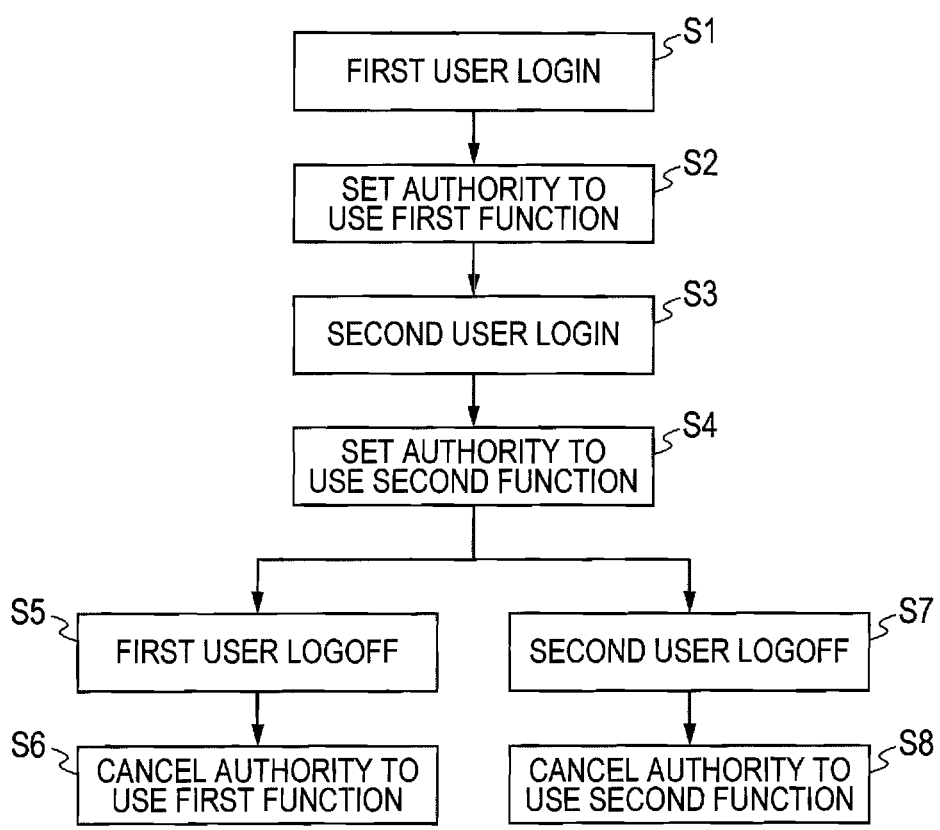
FIG. 3 is a diagram for illustrating the outline of a process of setting authority to use various functions of the MFP to a first user and a second user.

In a state where no user has logged in the MFP 2, as shown in FIG. 3, when a first user logs in the MFP 2 (S1), all the functions that are usable by the first user are identified as a first function. Then, authority to use the first function is set for the first user (S2).

If a second user different from the first user logs in the MFP 2 in a state where the login state of the first user is kept (S3), the first function is excluded from the functions of the MFP 2, and one or plurality of function, out of the remaining functions, that is usable by the second user is identified as a second function. Then, authority to use the second function is set for the second user (S4).

After that, when the first user logs off (S5), setting of authority to use the first function for the first user is cancelled (S6).

Further, when the second user logs off (S7), setting of authority to use the second function for the second user is cancelled (S8).

If a third user different from the first and second users logs in the MFP 2 in a state where the login state of the first user and the second user is kept, the first function and the second function are excluded from the functions of the MFP 2, and one or plurality of function, out of the remaining functions, that is usable by the third user is identified as a third function. Then, authority to use the third function is set for the third user. After that, similar processes are performed when still another user logs in.

<First Process>

Figure 4A:
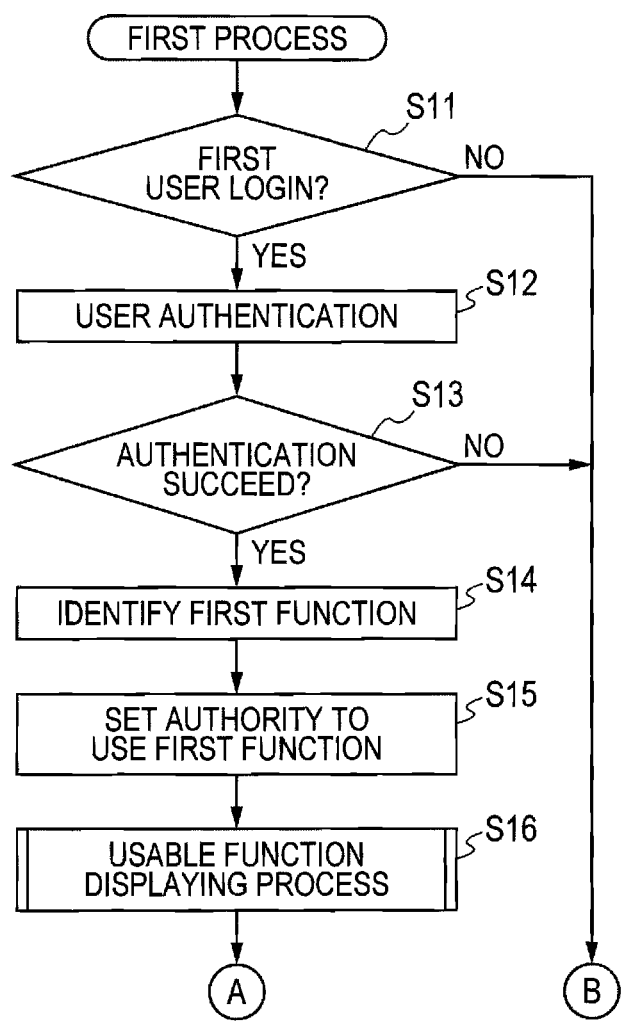
FIG. 4A is a flowchart showing the flow of a first process (first part)
Figure 4B:
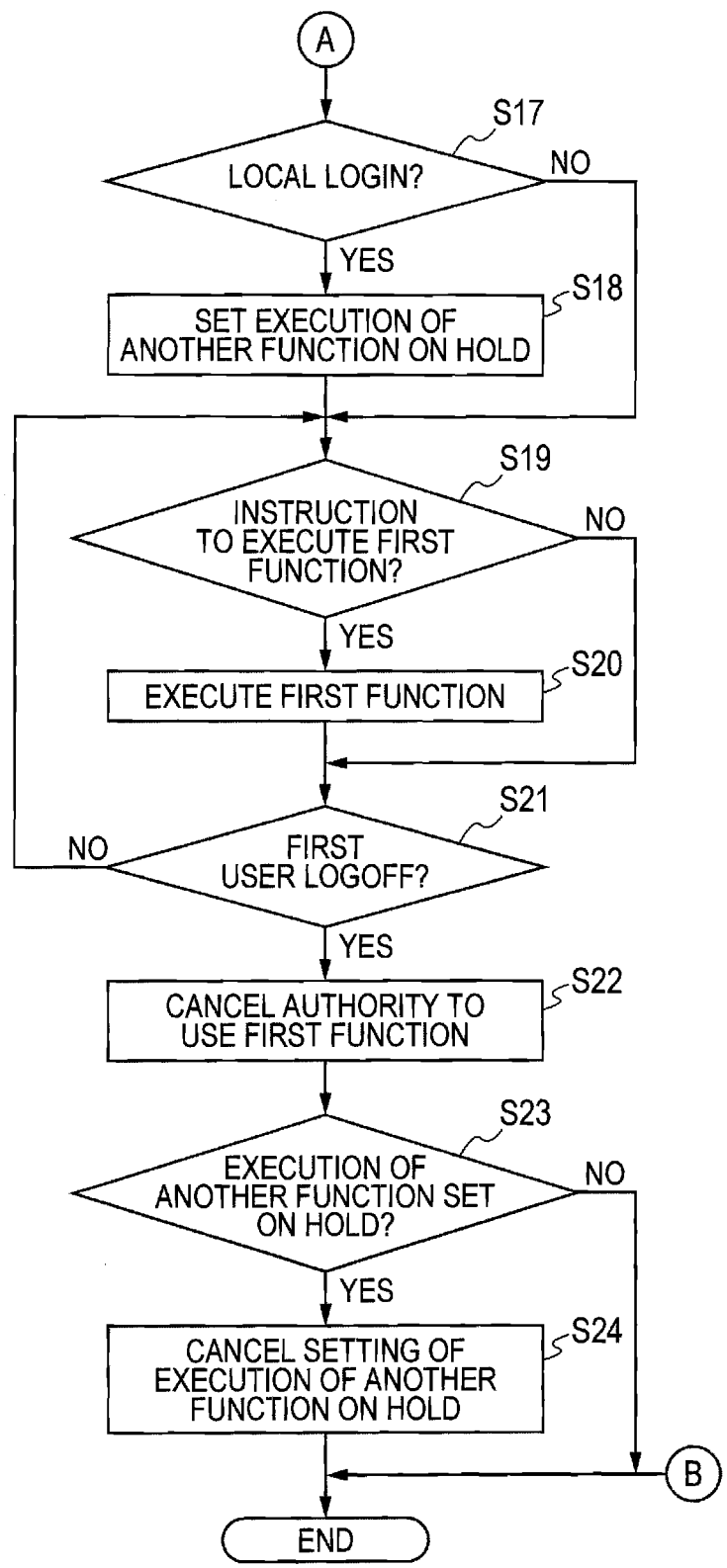
FIG. 4B is a flowchart showing the flow of the first process (second part)

In the MFP 2, the CPU 24 executes a first process shown in FIGS. 4A and 4B.

In the first process, the CPU 24 determines whether the first user has logged in to the MFP 2 (S11).

If the first user has not logged in (S11: NO), the CPU 24 ends the first process.

There are several methods to log in.

One method is login by operation of the operating unit 14 (local login). In this method, a user operates the operating unit 14 to input, to the MFP 2, a user ID and a user authentication password that are authentication information of the user.

One of other methods is login using an ID card or a mobile terminal (local login). This method is effective in a case where the MFP 2 has a near field wireless communication function by NFC. The ID card or mobile terminal has therein an antenna and an IC chip for near field wireless communication. The IC chip stores the user ID and user authentication password. When the ID card or mobile terminal owned by a user is held near the MFP 2, the MFP 2 reads the user ID and the user authentication password from the IC chip by near field wireless communication.

Still another method is login from the external terminal 3 (for example, a PC or a mobile terminal) (remote login). In this method, the MFP 2 is accessed from the external terminal 3 by network communication. After the access, a login screen is displayed on the display 32 of the external terminal 3. When the user ID and the user authentication password are inputted in this login screen, the inputted user ID and user authentication password are transmitted from the external terminal 3 to the MFP 2 by network communication.

When the first user logs in to the MFP 2, that is, when the user ID and the user authentication password of the first user are inputted to the MFP 2 (S11: YES), the CPU 24 performs user authentication (S12).

A user management table is used for user authentication. The user management table is stored in the NVRAM of the RAM 23. In the user management table, the user ID of each user who is allowed to use the MFP 2 is associated with the user authentication password and functions that are usable by the user of the user ID. For example, in an example of the user management table, as shown in FIG. 5, a user ID "1234" is associated with a password "XXXX" and functions "A, B, C". Another user ID "5678" is associated with a password "YYYY" and functions "C, D". Still another user ID "3456" is associated with a password "ZZZZ" and a function "A". For example, the function "A" is a secure print function, the function "B" is a direct print function, the function "C" is a PC scan function, and the function "D" is a PC FAX function.

In the user authentication, the CPU 24 compares the inputted combination of the user ID and the user authentication password with combinations of the user ID and the user authentication password stored in the user management table. If the combinations of the user ID and the user authentication password stored in the user management table includes a combination identical to the inputted combination of the user ID and the user authentication password, it is determined that the user authentication succeeds. If there is no identical combination, it is determined that the user authentication fails.

If the user authentication fails (S13: NO), the CPU 24 ends the first process.

If the user authentication succeeds (S13: YES), the CPU 24 refers to the user management table and identifies all the functions associated with the user ID of the first user as the first function (S14).

Then, the CPU 24 sets authority to use the first function for the user ID of the first user (S15).

For example, in a case where the first user has the user ID "1234", the functions "A, B, C" associated with the user ID "1234" are identified as the first function, and authority to use the functions "A, B, C" is set for the user ID "1234".

Further, the CPU 24 executes a usable function displaying process (S16). The usable function displaying process will be described later.

After that, the CPU 24 determines whether login by the first user is local login (S17).

If the login by the first user is local login (S17: YES), the CPU 24 sets execution of another function on hold even if execution of the other function is instructed, the other function being a function other than the first function in the MFP 2 (S18).

On the other hand, if the login by the first user is not local login, that is, if the login by the first user is remote login (S17: NO), the setting of execution of the other function on hold is not performed.

After that, the CPU 24 determines whether the first user has instructed to execute any one of the first function (S19). The instruction of executing the function may be inputted by operation of the operating unit 14 regardless of whether the login by the first user is local login or remote login, or may be inputted from the external terminal 3 by network communication.

If it is instructed to execute any one of the first function (S19: YES), the CPU 24 executes the instructed function (S20).

If execution of the function is finished, the CPU 24 determines whether the first user has logged off (S21). If execution of none of the first function is instructed (S19: NO), the CPU 24 skips execution of the function and determines whether the first user has logged off (S21).

Until the first user logs off, determination of whether it is instructed to execute any one of the first function is repeated.

When the first user logs off (S21: YES), the CPU 24 cancels setting of authority to use the first function for the user ID of the first user (S22).

After that, the CPU 24 determines whether execution of the other function other than the first function is set on hold (S23).

If execution of the other function is not set on hold (S23: NO), the CPU 24 ends the first process.

On the other hand, if execution of the other function is set on hold (S23: YES), the CPU 24 cancels the setting (S24), and then ends the first process.

<Second Process>

Figure 6:
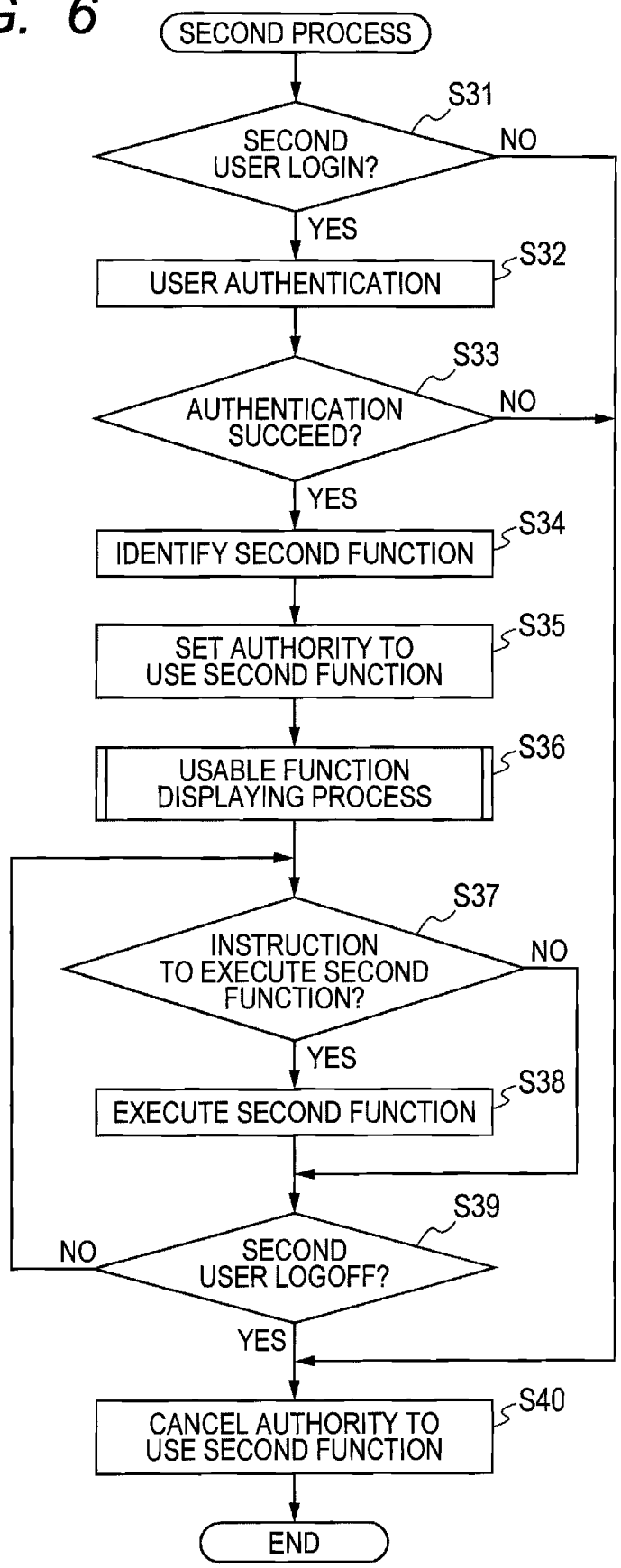
FIG. 6 is a flowchart showing the flow of a second process.

In the MFP 2, while the login state of the first user is kept, the CPU 24 executes a second process shown in FIG. 6.

In the second process, the CPU 24 determines whether the second user has logged in to the MFP 2 (S31).

If the second user has not logged in (S31: NO), the CPU 24 ends the second process.

If the second user logs in to the MFP 2, that is, if the user ID and the user authentication password of the second user are inputted to the MFP 2 (S31: YES), the CPU 24 performs user authentication (S32).

If the user authentication fails (S33: NO), the CPU 24 ends the second process.

If the user authentication succeeds (S33: YES), the CPU 24 excludes the first function from the functions of the MFP 2, refers to the user management table, and compares the remaining function with the function that is usable by the second user. Then, the CPU 24 identifies, as a second function, a function identical to the function that is usable by the second user, out of the remaining function that is obtained by excluding the first function from the functions of the MFP 2 (S34).

Then, the CPU 24 sets authority to use the second function, for the user ID of the second user (S35).

For example, in a case where the MFP 2 has functions "A, B, C, D, E" and the login state of the first user of the user ID "1234" is kept, the first functions "A, B, C" are excluded from the functions "A, B, C, D, E" of the MFP 2. And, in a case where the second user has user ID "5678", out of the remaining functions "D, E" of the MFP 2, function "D" identical to (that is, overlapping with) functions "C, D" associated with the user ID "5678" are identified as the second function. In this case, authority to use the function "D" is set for the user ID "5678". In other words, in this case, functions "C, D" identified by the user ID "5678" include a part of the first function "C" and also include a function other than the first function "D". So, the function other than the first function "D" is identified as the second function.

Here, if there is no function identical to a function that is usable by the second user out of the remaining functions that are obtained by excluding the first function from functions of the MFP 2, that is, if no second function is identified, the step of setting authority to use the second function for the user ID of the second user (S35) may be skipped naturally. This simplifies the contents of the second process.

Further, the CPU 24 executes a usable function displaying process (S36). The usable function displaying process will be described later.

After that, the CPU 24 determines whether the second user has instructed to execute any one of the second function (S37). The instruction of executing the function may be inputted by operation of the operating unit 14 regardless of whether the login by the second user is local login or remote login, or may be inputted from the external terminal 3 by network communication.

If it is instructed to execute any one of the second function (S37: YES), the CPU 24 executes the instructed function (S38). Regarding the second function that has been instructed to execute, if execution of such function is set on hold as described above, execution of the function is set on hold until this setting is cancelled.

When execution of the function is finished, the CPU 24 determines whether the second user has logged off (S39). Further, execution of none of the second function is instructed (S37: NO), the CPU 24 skips execution of the function and determines whether the second user has logged off (S39).

Until the second user logs off, determination of whether it is instructed to execute any one of the second function is repeated.

When the second user logs off (S39: YES), the CPU 24 cancels setting of authority to use the second function for the user ID of the second user (S40) and ends the second process.

<Usable Function Displaying Process>

In the usable function displaying process executed in the first process, that is, in the usable function displaying process executed in S16 of FIG. 4A, the CPU 24 determines whether login by the first user is local login (S51).

If the login by the first user is local login (S51: YES), the CPU 24 controls the display unit 13 to display, on a screen of the display unit 13, a list of the first function as the function that is currently usable by the first user (the function for which authority to use is set for the first user) (S52). By this process, the function that is usable by the first user can be visually recognized.

On the other hand, if the login by the first user is not local login (S51: NO), that is, if the login by the first user is remote login, the CPU 24 controls the network communicator 16 to notify the external terminal 3 that has performed remote login about the function that is currently usable by the first user (S53).

The usable function displaying process executed in the second process, that is, the usable function displaying process executed in S36 of FIG. 6 also proceeds in a similar flow to the usable function displaying process executed in the first process.

In other words, in the usable function displaying process executed in the second process, that is, the usable function displaying process executed in S36 of FIG. 6, the CPU 24 determines whether login by the second user is local login (S51).

If the login by the second user is local login (S51: YES), the CPU 24 controls the display unit 13 to display, on the screen of the display unit 13, a list of the second function as the function that is currently usable by the second user (the function for which authority to use is set for the second user) (S52). For example, the list of the second function may be displayed such that the list of the function that is usable by the second user is displayed on the screen, and that function that cannot be currently used by the second user, out of the displayed function, is displayed in such a manner that white and black are inverted. By this process, the function that is usable by the second user can be visually recognized.

On the other hand, if the login by the second user is not local login (S51: NO), that is, if the login by the second user is remote login, the CPU 24 controls the network communicator 16 to notify the external terminal 3 that has performed remote login about the function that is currently usable by the second user (S53).

<External Terminal Displaying Process>

Figure 8:
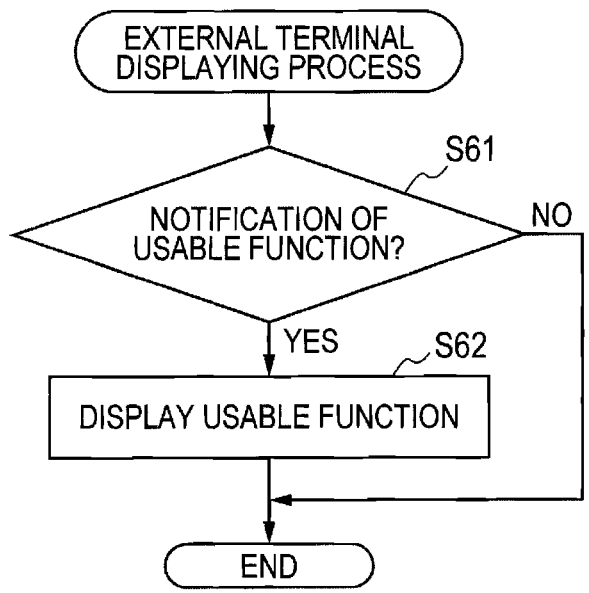
FIG. 8 is a flowchart showing the flow of an external terminal displaying process.

When the first user or the second user has logged in to the MFP 2 from the external terminal 3, the external terminal 3 executes an external terminal displaying process shown in FIG. 8.

Figure 7:
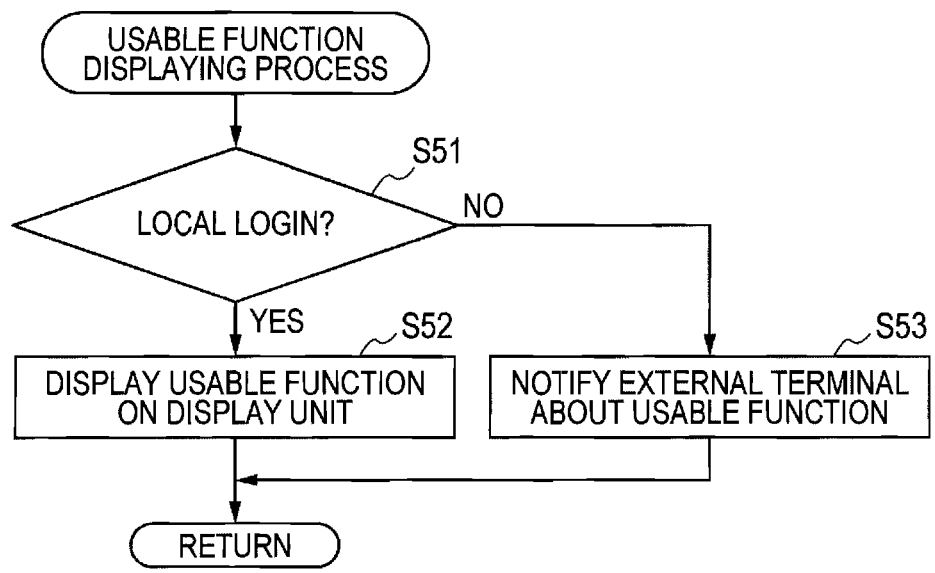
FIG. 7 is a flowchart showing the flow of a usable function displaying process.

In the external terminal displaying process, the controller 31 determines whether the controller 31 has received notification of a function that is currently usable by the first user or the second user (S61) by the usable function displaying process shown in FIG. 7.

When the controller 31 receives notification of the usable function (S61: NO), the controller 31 ends the external terminal displaying process and, after that, again executes the external terminal displaying process.

When the controller 31 receives notification of the usable function (S61: YES), the controller 31 displays the list of the notified function on the screen of the display 32 (S62).

Specifically, when the first user logs in to the MFP 2 from the external terminal 3 and notification of the function that is currently usable by the first user is received from the MFP 2, the controller 31 displays the list of the function that is currently usable by the first user on the screen of the display 32.

Further, when the second user logs in to the MFP 2 from the external terminal 3 and notification of the function that is currently usable by the second user is received from the MFP 2, the controller 31 displays the list of the function that is currently usable by the second user on the screen of the display 32. For example, the list of the second function may be displayed such that the list of the function that is usable by the second user is displayed on the screen, and that function that cannot be currently used by the second user, out of the displayed function, is displayed in such a manner that white and black are inverted.

By this process, the function that is currently usable by each of the first user and the second user can be visually recognized.

Advantageous Effects

As described above, if user authentication succeeds after the user ID of the first user is inputted to the MFP 2 by login of the first user, one or plurality of the first function corresponding to the user ID of the first user is identified from among the plurality of functions of the MFP 2. And, authority to use the identified first function is set for the user ID of the first user.

After that, if user authentication succeeds after the user ID of the second user is inputted to the MFP 2 by login of the second user, the first function is excluded from the plurality of functions of the MFP 2, and one or plurality of the second function corresponding to the user ID of the second user is identified from among the remaining function. And, authority to use the identified second function is set for the user ID of the second user.

By this process, the first user who first performs an operation for using the function can use all the functions corresponding to the user ID of the first user, and is not limited by use of the function by the second user who later performs an operation for using the function. On the other hand, the second user who later performs an operation for using the function cannot use the functions corresponding to the user ID of the first user, but can use functions other than that.

Thus, functions can be used reasonably by the first user who first performs an operation for using a function and by the second user who later performs an operation for using a function.

The user management table stored in the NVRAM of the RAM 23 is used for identifying the first function and the second function. By this process, each of the first function and the second function can be identified easily.

Further, after authority to use the first function is set for the user ID of the first user, when the first user instructs to execute one or more function included in the first function in a state where the login state of the first user is kept, the function relating to that instruction is executed. Similarly, after authority to use the second function is set for the user ID of the second user, when the second user instructs to execute one or more function included in the second function in a state where the login state of the second user is kept, the function relating to that instruction is executed.

However, in a case where the login of the first user is local login, execution of the second function is put on hold until a possibility of executing the first function disappears, that is, until the first user logs off. By this process, the first user who first performs an operation for using a function can use the function of the MFP 2 preferentially over the second user who later performs an operation for using the function. Thus, it is possible to secure convenience of the first user who first performs an operation for using the function. Further, because the first user who performs local login is likely to be near the MFP 2, it is preferable not to start an operation of the MFP 2 due to execution of the second function. If the operation of the MFP 2 due to execution of the second function is started, the first user may feel uncomfortable.

Second Embodiment

Figure 9A:
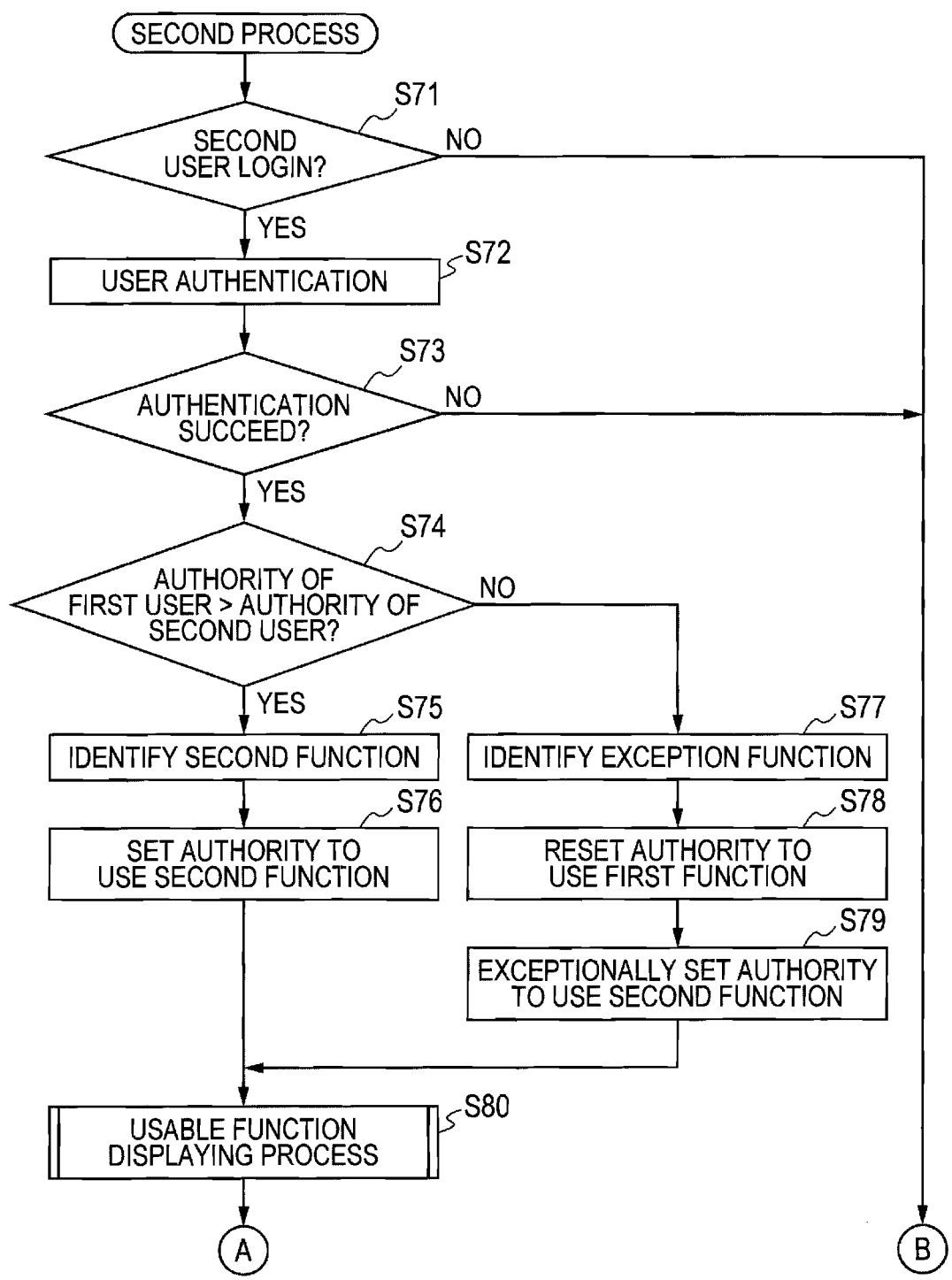
FIG. 9A is a flowchart showing the flow of a second process according to a second embodiment (first part)
Figures 9B, 10A, 10B:
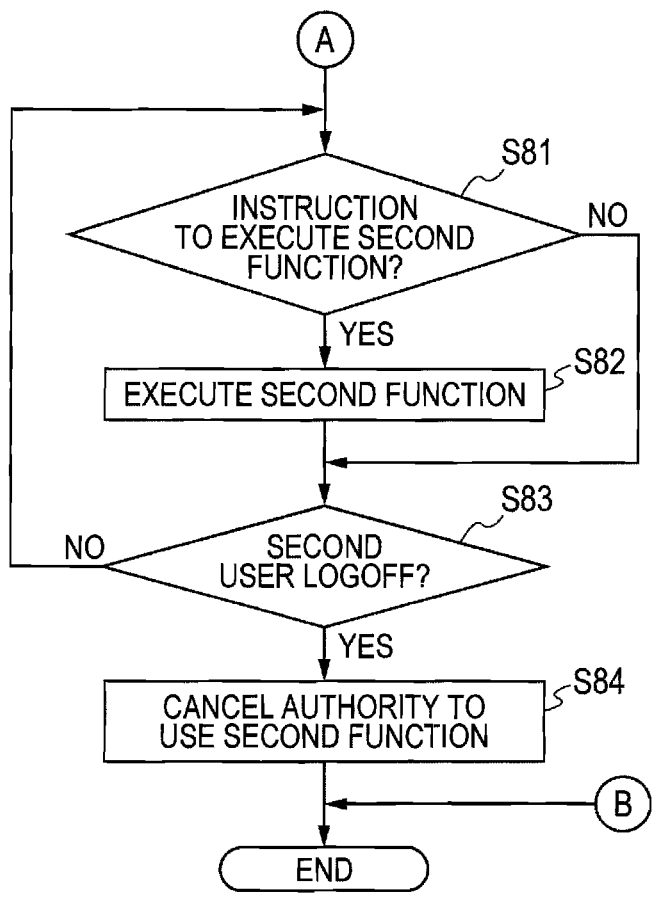
FIG. 9B is a flowchart showing the flow of the second process (second part)
FIGS. 10A and 10B show examples of a function management table according to a third embodiment.

A second process shown in FIGS. 9A and 9B may be executed instead of the second process shown in FIG. 6. For executing the second process shown in FIGS. 9A and 9B, a level of authority is set to the user ID of each user. For example, in a company, relatively high authority is set to the user ID of a user in a relatively high position, and relatively low authority is set to the user ID of a user in a relatively low position.

In the second process shown in FIGS. 9A and 9B, the CPU 24 determines whether the second user has logged in to the MFP 2 (S71).

If there is no login by the second user (S71: NO), the CPU 24 ends the second process.

If the second user logs in to the MFP 2, that is, if the user ID of the second user and user authentication password are inputted to the MFP 2 (S71: YES), the CPU 24 executes user authentication (S72).

If the user authentication fails (S73: NO), the CPU 24 ends the second process.

If the user authentication succeeds (S73: YES), the CPU 24 determines whether authority set to the user ID of the first user who keeps the login state (first user authority) is higher than authority set to the user ID of the second user (second user authority) (S74).

If the first user authority is higher than the second user authority (S74: YES), the CPU 24 excludes the first function from the functions of the MFP 2, refers to the user management table, and compares the remaining function with the function that is usable by the second user. And, the CPU 24 identifies, as the second function, a function identical to the function that is usable by the second user, out of the remaining function that is obtained by excluding the first function from the functions of the MFP 2 (S75).

Then, the CPU 24 sets authority to use the second function to the user ID of the second user (S76).

On the other hand, the first user authority is lower than the second user authority (S74: NO), the CPU 24 executes an exception function identifying process (S77). In the exception function identifying process, first, the CPU 24 refers to the user management table, and identifies, as the second function, all the functions associated with the user ID of the second user. Next, the CPU 24 excludes the second function from the functions of the MFP 2, refers to the user management table, and compares the remaining function with the function that is usable by the first user. And, the CPU 24 identifies, as the first function, a function identical to the function that is usable by the first user, out of the remaining function that is obtained by excluding the second function from the functions of the MFP 2.

After the exception function identifying process, the CPU 24 again sets (resets) authority to use the first function for the user ID of the first user (S78).

Further, the CPU 24 sets authority to use the second function for the user ID of the second user (S79).

After that, the CPU 24 executes the usable function displaying process (S80). The usable function displaying process is as described above.

After that, the CPU 24 determines whether execution of any function of the second function has been instructed by the second user (S81).

If execution of any function of the second function has been instructed (S81: YES), the CPU 24 executes the instructed function (S82).

Upon completion of execution of the function, the CPU 24 determines whether the second user has logged off (S83). Further, if execution of no function of the second function has been instructed (S81: NO), the CPU 24 skips execution of the function, and determines whether the second user has logged off (S83).

Until the second user logs off, determination of whether execution of any function of the second function has been instructed is repeated.

When the second user logs off (S83: YES), the CPU 24 cancels setting of authority to use the second function for the user ID of the second user (S84), and ends the second process.

In this way, a user having relatively high authority can use functions of the MFP 2 preferentially over a user having relatively low authority. Thus, it is possible to secure convenience of the user who has high authority. Note that, if the above-described exception function identifying process is executed, after that, even if a setting is such that execution of the second function instructed to execute the function is put on hold, execution of the function is not put on hold.

Third Embodiment

In each of the above-described embodiments, the first function and the second function are identified by using the user management table of which an example is shown in FIG. 5. However, the first function and the second function may be identified by using a function management table of which an example is shown in FIGS. 10A and 10B.

The function management table is stored in the NVRAM of the RAM 23 (see FIG. 2). In the function management table, login methods and functions are associated with each other. In an example of the function management table, as shown in FIG. 10A, local login is associated with functions "A, B", and remote login is associated with functions "C, D". In another example of the function management table, as shown in FIG. 10B, local login is associated with functions "A, B, C, D", and remote login is associated with function "A". Note that the function management tables shown in FIGS. 10A and 10B are merely examples. For example, local login may be associated with functions "C, D", and remote login may be associated with functions "A, B".

If the first user performs local login to the MFP 2 in a state where no user logs in to the MFP 2, all the functions associated with the local login are identified as the first function. Further, if the first user performs remote login to the MFP 2 in a state where no user logs in to the MFP 2, all the functions associated with the remote login are identified as the first function. And, authority to use the first function is set for the first user.

If a second user different from the first user logs in to the MFP 2 in a state where the login state of the first user is kept and if the login method is different from the login method of the first user, authority to use the second function is set for the second user. That is, in a case where the login of the first user is local login, when the second user performs remote login, the first function is excluded from the functions of the MFP 2, and a function associated with remote login, out of the remaining function, is identified as the second function. Further, in a case where the login of the first user is remote login, when the second user performs local login, the first function is excluded from the functions of the MFP 2, and a function associated with local login, out of the remaining function, is identified as the second function. And, authority to use the second function is set for the second user.

In a case where the login method of the second user is the same as the login method of the first user, when the first function is excluded from the functions of the MFP 2, the remaining function does not include a function associated with the login method of the second user. Hence, no authority to use the second function is set for the second user.

By this process, the first user can use all the functions corresponding to the login method of the first user, and is not limited by use of the function by the second user. On the other hand, the second user cannot use the functions corresponding to the login method of the first user but, when the second user logs in with a method different from the login method of the first user, the second user can use the other functions.

Thus, functions can be used reasonably by the first user who first performs an operation for using a function and by the second user who later performs an operation for using a function.

An example is described with reference to the function management table of FIG. 10B. Assume that the MFP 2 has functions "A, B, C, D, E", and that the second user logs in to the MFP 2 in a state where the login state of the first user is kept. The login of the first user is local login. So, functions "A, B, C, D" are set as the first function, based on FIG. 10B. When the second user performs remote login, the function corresponding to the remote login "A" (FIG. 10B) include at least part of the first function "A, B, C, D", but does not include a function other than the first function. So, in this case, no function is identified as the second function.

Next, assume that the login of the first user is remote login. So, function "A" is set as the first function. When the second user performs local login, the functions corresponding to the local login "A, B, C, D" (FIG. 10B) include at least part of the first function "A" and also include a function "B, C, D" other than the first function "A". So, in this case, the functions "B, C, D" are identified as the second function.

Modifications

While the disclosure has been described in detail with reference to the above aspects thereof, it would be apparent to those skilled in the art that various changes and modifications may be made therein without departing from the scope of the claims. In the following description, like parts and components are designated by the same reference numerals to avoid duplicating description.

A case is described above that, in a state where the login state of the first user and the second user is kept, a different third user logs in. A case is also conceived that, the first user logs off from a state where the login state of the first user and the second user is kept, and then the third user logs in.

In this case, the second function may be excluded from the functions of the MFP 2, and one or plurality of function that is usable by the third user, out of the remaining functions, may be identified as a third function. Or, all the functions associated with the user ID of the second user may be excluded from the functions of the MFP 2, and one or plurality of function that is usable by the third user, out of the remaining functions, may be identified as the third function.

A function overlapping the function associated with the user ID of the first user, out of functions associated with the user ID of the second user, is not identified as the second function. Hence, in the former identifying method, if the overlapping function is included in the function associated with the user ID of the third user, the overlapping function is identified as the third function. As a result of that, a situation arises that although authority to use the overlapping function is not set for the user ID of the second user, the authority to use the overlapping function is set for the user ID of the third user who has logged in later. In the latter case, occurrence of such situation can be prevented.

In the above-described embodiment, the CPU 24 executes each process. However, the MFP 2 may have a plurality of CPUs, and the plurality of CPUs may execute each process in cooperation with each other.

Further, the MFP 2 having a printer function, a scanner function, and a facsimile function has been described as an example of a processing apparatus. However, the processing apparatus may be an apparatus having one or plurality of functions out of the printer function, the scanner function, and the facsimile function.

What is claimed is:

1. A processing apparatus comprising:
   a network interface configured to be connected to one or plurality of connected apparatuses through a network and configured to receive information transmitted from the one or plurality of connected apparatuses;
   a user interface configured to receive input of information;
   a processor; and
   a memory storing instructions, the instructions, when executed by the processor, causing the processor to perform:
   identifying, in response to reception of first information by one of the network interface and the user interface, one or more functions corresponding to the first information among a plurality of functions relating to image data as a first function, the plurality of functions comprising printing, scanning and faxing;
   setting, to the first information, a first authority to use the first function;
   after setting the first authority, when one of the network interface and the user interface receives second information different from the first information and when functions corresponding to the second information among the plurality of functions include at least one of the one or more functions identified as the first function, excluding the first function as functions available for the processing apparatus and identifying remaining functions corresponding to the second information as a second function;
   setting, to the second information, a second authority to use the second function, without giving an authority to use the first function to the second information;
   determining whether the first information is received via the user interface or the network interface;
   when the user interface receives the first information, putting an execution hold on the execution of functions other than functions included in the first function, until it is determined that a login state based on the first information is ended;
   after the setting the first authority, when one of the network interface and the user interface receives an instruction for executing a function included in the first function in association with the first information, executing the function included in the first function; and
   after the setting the second authority, when one of the network interface and the user interface receives an instruction for executing a function included in the second function in association with the second information, executing the function included in the second function based on the determining.

2. The processing apparatus according to claim 1, wherein the first information and the second information are authentication information relating to users of the processing apparatus; and wherein the memory further storing instructions, the instructions, when executed by the processor, causing the processor to perform:

determining, when one of the network interface and the user interface receives the first information or the second information, whether the received first information or second information is authentication information that is stored as the received first information or second information is associated with at least one of the plurality of functions.

3. The processing apparatus according to claim 1, wherein the memory is configured to store:

first data having the first information and a first set function for which authority to use is set, the first information and the first set function being associated with each other; and second data having the second information and a second set function for which authority to use is set, the second information and the second set function being associated with each other; and wherein the identifying the first function and the identifying the second function comprise identifying the one or more functions corresponding to the first information and functions corresponding to the second information, based on the first data and the second data.

4. The processing apparatus according to claim 1, wherein each of the first information and the second information has a level of authority; and wherein, when executed by the processor, the instructions cause the processor to perform:

determining, after the setting first authority, in response to reception of second information by one of the network interface and the user interface, the level of authority of the first information and the second information;

in response to determining that the level of authority of the first information is higher than the level of authority of the second information, executing the excluding the first function as functions available for the processing apparatus and identifying remaining functions corresponding to the second information;

in response to determining that the level of authority of the second information is higher than the level of authority of the first information, identifying as the second function, functions corresponding to the second information from among the plurality of functions, and excluding the second function as functions available for the processing apparatus and identifying remaining functions corresponding to the first information as the first function instead of excluding the first function as functions available for the processing apparatus and identifying remaining functions corresponding to the second information; and in response to identifying as the second function, functions corresponding to the second information from among the plurality of functions, and excluding the second function as functions available for the processing apparatus and identifying remaining functions corresponding to the first information as the first function, resetting, to the first information, authority to use the remaining functions as the first function, and setting, to the second information, authority to use the functions corresponding to the second information as the second function.

5. A processing apparatus comprising:

a network interface configured to be connected to one or plurality of connected apparatuses through a network and configured to receive information transmitted from the one or plurality of connected apparatuses;

a user interface configured to receive input of information;

a processor; and a memory storing instructions, the instructions, when executed by the processor, causing the processor to perform:

identifying, in response to reception of first information by a first interface that is one of the network interface and the user interface, one or more functions corresponding to the first interface among a plurality of functions relating to image data as a first function, the plurality of functions comprising printing, scanning and faxing;

setting, to the first information, a first authority to use the first function;

after setting the first authority, when second information is received by a second interface that is another one of the network interface and the user interface and when functions corresponding to the second interface among the plurality of functions include at least one of the one or more functions identified as the first function, excluding the first function as functions available for the processing apparatus and identifying remaining functions corresponding to the second interface as a second function; and setting, to the second information, a second authority to use the second function, without giving an authority to use the first function to the second information, determining whether the first information is received via the user interface or the network interface;

when the user interface receives the first information, putting an execution hold on the execution of functions other than functions included in the first function, until it is determined that a login state based on the first information is ended, after the setting the first authority, when one of the network interface and the first interface receives an instruction for executing a function included in the first function in association with the first information, executing the function included in the first function; and after the setting the second authority, when one of the network interface and the second interface receives an instruction for executing a function included in the second function in association with the second information, executing the function included in the second function based on the determining.

6. The processing apparatus according to claim 5, further comprising a first display, wherein the memory further storing instructions, the instructions, when executed by the processor, causing the processor to perform:

displaying, in response to reception of the first information by the user interface, after setting the first authority, a screen corresponding to the first function on the first display;

displaying, in response to reception of the second information by the user interface, after setting the second authority, a screen corresponding to the second function on the first display;

transmitting, in response to reception of the first information by the network interface, after setting the first authority, first notification from the network interface to the one or plurality of connected apparatuses from which the first information is received, the first notification being notification that authority to use the first function is set to the first information; and transmitting, in response to reception of the second information by the network interface, after setting the second authority, second notification from the network interface to the one or plurality of connected apparatuses from which the second information is received, the second notification being notification that authority to use the second function is set to the second information.

7. The processing apparatus according to claim 5, wherein the plurality of functions includes a printer function of forming an image of the image data on a sheet, a scanner function of reading an original document and acquiring the image data, and a facsimile function of transmitting and receiving the image data through a public telephone network; and wherein the memory further storing instructions, the instructions, when executed by the processor, causing the processor to perform:

in response to reception of the first information by the network interface, identifying the printer function as the first function; and in response to reception of the second information by the user interface, identifying the facsimile function and the scanner function as the second function.

8. The processing apparatus according to claim 5, wherein the memory is configured to store:

first data having a first login method and a first set function for which authority to use is set, the first login method being a login method through the user interface, the first login method and the first set function being associated with each other; and second data having a second login method and a second set function for which authority to use is set, the second login method being a login method through the network interface, the second login method and the second set function being associated with each other; and wherein the identifying the first function and the identifying the second function comprise identifying the one or more functions corresponding to the first interface and the functions corresponding to the second interface, based on the first data and the second data.

9. An authority setting method executable by a processing apparatus, the processing apparatus having a network interface configured to be connected to one or plurality of connected apparatuses through a network and configured to receive information transmitted from the one or plurality of connected apparatuses, and a user interface configured to receive input of information, the method comprising:

identifying, in response to reception of first information by one of the network interface and the user interface, one or more functions function corresponding to the first information among a plurality of functions relating to image data as a first function, the plurality of functions comprising printing, scanning and faxing;

setting, to the first information, a first authority to use the first function;

after setting the first authority, when one of the network interface and the user interface receives second information different from the first information and when functions corresponding to the second information among the plurality of functions include at least one of the one or more functions identified as the first function, excluding the first function as functions available for the processing apparatus and identifying remaining functions corresponding to the second information as a second function;

setting, to the second information, a second authority to use the second function, without giving an authority to use the first function to the second information;

determining whether the first information is received via the user interface or the network interface;

when the user interface receives the first information, putting an execution hold on the execution of functions other than functions included in the first function, until it is determined that a login state based on the first information is ended, after the setting the first authority, when one of the network interface and the user interface receives an instruction for executing a function included in the first function in association with the first information, executing the function included in the first function; and after the setting the second authority, when one of the network interface and the user interface receives an instruction for executing a function included in the second function in association with the second information, executing the function included in the second function based on the determining.

10. A non-transitory computer-readable storage medium storing a program executable on a processing apparatus, the processing apparatus having a network interface configured to be connected to one or plurality of connected apparatuses through a network and configured to receive information transmitted from the one or plurality of connected apparatuses, and a user interface configured to receive input of information, the program when executed by a processor of the processing apparatus causes, the processor to execute:

identifying, in response to reception of first information by one of the network interface and the user interface, one or more functions corresponding to the first information among a plurality of functions relating to image data as a first function, the plurality of functions comprising printing, scanning and faxing;

setting, to the first information, a first authority to use the first function;

after the first authority setting instruction, when one of the network interface and the user interface receives second information different from the first information and when functions corresponding to the second information out of the plurality of functions include at least one of the one or more functions identified as the first function, excluding the first function as functions available for the processing apparatus and identifying remaining functions corresponding to the second information as a second function;

setting, to the second information, a second authority to use the second function, without giving an authority to use the first function to the second information;

determining whether the first information is received via the user interface or the network interface;

when the user interface receives the first information, putting an execution hold on the execution of functions other than functions included in the first function, until it is determined that a login state based on the first information is ended, after the setting the first authority, when one of the network interface and the user interface receives an instruction for executing a function included in the first function in association with the first information, executing the function included in the first function; and after the setting the second authority, when one of the network interface and the user interface receives an instruction for executing a function included in the second function in association with the second information, executing the function included in the second function based on the determining.

* * * * *